United States Patent Office 3,806,516
Patented Apr. 23, 1974

3,806,516
PROCESS FOR THE RACEMIZATION OF TETRAMISOLE
Asbjorn Baklien, Kingsbury, Victoria, Australia, assignor to ICI Australia Limited, Melbourne, Victoria, Australia
No Drawing. Filed July 21, 1972, Ser. No. 273,807
Claims priority, application Australia, July 26, 1971, 5,671/71
Int. Cl. C07d 99/10
U.S. Cl. 260—306.7     9 Claims

ABSTRACT OF THE DISCLOSURE

A process of at least partly racemizing an isomer of tetramisole which comprises heating said isomer to a temperature between 50 and 120° C. in a non-aqueous, polar aprotic solvent medium in the presence of firstly, at least one onium salt, soluble in the medium and having the formula $(R_nX^+)Z^-$ wherein X is N, P or S; each R, separately is defined as an alkyl or aralkyl group having 1 to 12 inclusive carbons, $n$ is 4 whenever X is N or P and 3 whenever X is S, and Z is an anion as strongly nucleophilic as, or more strongly nucleophilic than the bromide ion and, secondly, of an epoxy or imino compound of the formula:

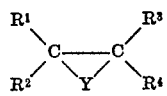

wherein $R^1$ to $R^4$ inclusive, each separately, is an alkyl group having 1 to 4 carbons or phenyl and Y is oxygen or $NR^5$, $R^5$ being hydrogen or an alkyl group having 1 to 4 inclusive carbons.

---

The present invention relates to the racemization of the optical isomers of tetramisole.

Tetramisole, D,L-2,3,5,6-tetrahydro - 6 - phenylimidazo(2,1-b)thiazole, which is subject of British Pat. No. 1,043,489, is an extremely potent anthelmintic. It is known that its anthelmintic acivity is almost entirely attributable to the optical L-isomer and in U.S. Pat. No. 3,579,530 there is provided a process for the efficient resolution of the racemate to the tetramisole L-isomer, which is obtained as a highly pure crystal crop.

As a by-product of this process, crude D-tetramisole is obtained which contains predominantly D-isomer, usually between 94 and 100%, and a small residue of L-isomer. It will be understood by those skilled in the art that either L-isomer or D-isomer can be produced as the crystal crop in the resolution process and accordingly the by-product in the mother liquor may be D- or L-isomer respectively depending on the optical rotation of the resolving agent used. The present process is devised to racemize D- or L-isomer; however in technical practice it is almost invariably the biologically active L-isomer which is the desired product and D- is, therefore, the isomer to be racemized.

We have found that either optical isomer of tetramisole, particularly the D-isomer, can be converted to the isomer of the opposite sign to yield a D,L-racemate if it is treated at elevated temperatures with a mixture of a soluble onium salt of a nucleophilic anion and an epoxy or amino compound as defined below.

Accordingly we provide a process of at least partly racemizing an isomer of tetramisole which comprises heating said isomer to a temperature between 50 and 120° C. in a non-aqueous, polar aprotic solvent medium in the presence of firstly, at least one onium salt, soluble in the medium and having the formula $(R_nX^+)Z^-$ wherein X is N, P or S; each R, separately is defined as an alkyl or aralkyl group having 1 to 12 inclusive carbons, $n$ is 4 whenever X is N or P and 3 whenever X is S, and Z is an anion as strongly nucleophilic as, or more strongly nucleophilic than the bromide ion and, secondly, of an epoxy or imino compound of the formula:

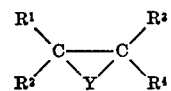

wherein $R^1$ to $R^4$ inclusive, each separately, is an alkyl group having 1 to 4 carbons or phenyl and Y is oxygen or $NR^5$, $R^5$ being hydrogen or an alkyl group having 1 to 4 inclusive carbons.

Suitable onium cations are, e.g. the alkyl ammonium or phosphonium cations; suitable anions, with the required degree of nucleophilicity are, e.g. —I, —Br, —SCN, the alkylsulphates and the alkane-, aralkane-, arene or alkarene sulphonates.

Preferred onium cations are the lower alkyl ammonium ions; the preferred anion is iodide. By lower alkyl we mean an alkyl group containing from 1 to 6 carbon atoms.

Particularly preferred salts are the tetra(lower alkyl) ammonium iodides.

Suitable nucleophilic compounds of the formula:

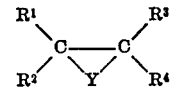

are ethylenimine and ethylene oxide and their simple alkyl and aryl homologues. The higher epoxides and aziridines, while operative, are less convenient; the preferred reagents are, therefore, the lowest homologue ethylenimine and ethylene oxide; most preferred is ethylenimine. Suitable higher epoxides and aziridines are: 2,2-dimethylethylenimine, 1-methylethylenimine, 2-methylethylenimine, 2,3-dimethylethylenimine, 2-phenylethylenimine, propylene oxide, 1,2-butylene oxide, 2,3-butylene oxide, 2,2-dimethylethylene oxide, cyclohexene oxide and styrene oxide.

Polar aprotic solvents are known, e.g. from the article by A. J. Parker (Quarterly Reviews 1962, vol. XVI, No. 2, pp. 163–187); amongst these, particularly preferred are dimethyl formamide and dimethyl sulphoxide.

Tetramisole is unstable at high temperatures. Consequently the treatment temperature should be as low as compatible with the required degree of racemization; useful yields can be obtained above 50° C. and excellent yields are obtained near 100° C. While we do not wish to be bound by theory, we consider that the reaction proceeds via a nucleophilic attack of the anion of the onium salt on the aziridine or epoxide, as shown schematically by step 1 below; the resulting anion interacts to abstract a proton from tetramisole according to step 2 below. The intermediate tetramisole anion then proceeds to abstract another proton from the medium and thus forms D- and L-isomers in equal proportions as indicated in step 3 below; this process, over a period of time, results in partial or complete racemization.

STEP 1

A. Ethylenimine

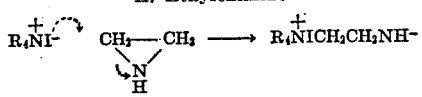

B. Ethylene oxide

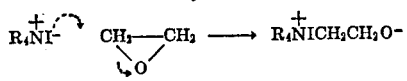

STEP 2

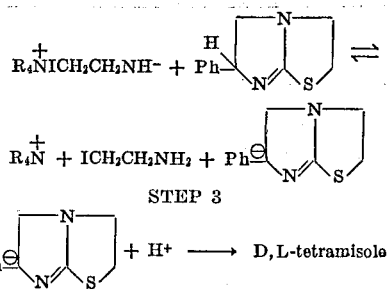

STEP 3

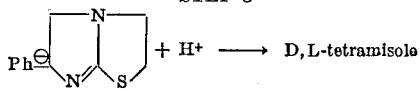 + H⁺ ⟶ D,L-tetramisole

The reagents, particularly the onium compounds, must be at least partly soluble in the reaction medium; somewhat longer chain alkyl onium compounds, e.g. tetrabutyl ammonium iodide are therefore particularly suitable.

An advantage of our invention is that the reagents are relatively cheap, common chemicals and, in contrast to other racemizing agents, e.g. lithium alkyls, are non-pyrophoric.

Our invention is now demonstrated by but not limited to the following examples, in which all parts unless otherwise stated are by weight.

EXAMPLE 1

D-6-phenyl-2,3,5,6-tetrahydroimidazo(2,1 - b)thiazole ($\alpha_D^{20}$ +79°, C10, CHCl$_3$) (10.2 g., 0.05 mol), tetrabutylammonium iodide (18.4 g., 0.05 mol) and ethyleneimine (2.5 ml., 2.08 g., 0.05 mol) were dissolved in 25 ml. of dry dimethylformamide. The solution was heated in a pressure bottle at 110° C. for 8 hours. After cooling, an equal volume of water was added. The solution was made alkaline to pH 11.5 with sodium hydroxide and extracted with 2× 25 ml. of methylene chloride. The combined extracts were then extracted with 20 ml. of water, the organic layer separated and dried over anhydrous Na$_2$SO$_4$, filtered, and the solvent removed by distillation. The residual product was washed with cold n-hexane and dried. Yield 8.4 g., specific rotation $\alpha_D^{20}$ +6° (C10, CHCl$_3$).

EXAMPLE 2

The procedure of Example 1 was repeated using only 4.6 g. of tetrabutylammonium iodide and 0.6 g. of ethylenimine. The product obtained had the specific rotation $\alpha_D^{20}$ +11.2° (C10, CHCl$_3$).

EXAMPLE 3

The procedure of Example 2 was repeated using 0.9 g. of 2,2-dimethylethylenimine instead of ethylenimine. The product obtained had a specific rotation $\alpha_D^{20}$ +6° (C10, CHCl$_3$).

EXAMPLE 4

Tetrabutylammonium iodide (18.4 g.), ethylene oxide (2.2 g.) and dry dimethylformamide (25 ml.) were heated in a pressure tube at 170° C. for 5 hours. The mixture was cooled, D-6-phenyl-2,3,5,6-tetrahydroimidazo(2,1-b)thiazole ($\alpha_D^{20}$ +79°, C10, CHCl$_3$) (10.2 g.) added, and heating continued at 100° C. for 7 hours. After cooling, an equal volume of water was added. The solution was acidified to Congo red with dilute hydrochloric acid and extracted with 2× 25 ml. of methylene chloride. The aqueous layer was made alkaline with sodium hydroxide and extracted with 2× 25 ml. of methylene chloride. The combined extracts were dried over anhydrous Na$_2$SO$_4$, filtered, and the solvent removed by distillation to leave 9.6 g. of product with specific rotation $\alpha_D^{20}$ +8.6° (C10, CHCl$_3$).

EXAMPLE 5

The procedure of Example 4 was repeated using 0.6 g. of ethylene oxide and 4.6 g. of tetrabutylammonium iodide. The product obtained had specific rotation $\alpha_D^{20}$ +9.2° (C10, CHCl$_3$).

EXAMPLE 6

The procedure of Example 4 was repeated using 3.6 g. of 2,2-dimethylethylene oxide instead of ethylene oxide and 12.2 g. of butyltrimethylammonium iodide instead of tetrabutylammonium iodide. The product obtained had specific rotation $\alpha_D^{20}$ +8.6° (C10, CHCl$_3$).

EXAMPLE 7

The procedure of Example 4 was repeated using 4.9 g. of cyclohexene oxide instead of ethylene oxide and 12.9 g. tetraethylammonium iodide. The product obtained had specific rotation $\alpha_D^{20}$ +11.2° (C10, CHCl$_3$).

EXAMPLE 8

The procedure of Example 4 was repeated using 16.1 g. of tetrabutylammonium bromide instead of the iodide. The product obtained had a specific rotation $\alpha_D^{20}$ +12.7° (C10, CHCl$_3$).

I claim:

1. A process of at least partly racemizing an isomer of tetramisole which comprises heating said isomer to a temperature between 50 and 120° C. in a non-aqueous, polar aprotic solvent medium in the presence of firstly, at least one onium salt, soluble in the medium and having the formula (R$_n$X⁺)Z⁻ wherein X is N, P or S; each R, separately is defined as an alkyl or aralkyl group having 1 to 12 inclusive carbons, $n$ is 4 whenever X is N or P and 3 whenever X is S, and Z is an anion as strongly nucleophilic as, or more strongly nucleophilic than the bromide ion and, secondly, of an epoxy or imino compound of the formula:

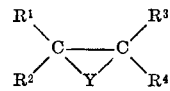

wherein R$^1$ to R$^4$ inclusive, each separately, is hydrogen, an alkyl group having 1 to 4 carbons or phenyl or R$^1$ and R$^3$ together form an alkylene group and wherein at least two of R$^1$ to R$^4$ inclusive are hydrogen atoms and wherein not more than one of R$^1$ to R$^4$ inclusive are phenyl groups and Y is oxygen or NR$^5$, R$^5$ being hydrogen or an alkyl group having 1 to 4 inclusive carbons.

2. A process according to claim 1 wherein R is lower alkyl and X is N.

3. A process according to claim 1 wherein Z⁻ is I⁻.

4. A process according to claim 1 wherein the onium salt is a tetra(lower alkyl) ammonium iodide.

5. A process according to claim 1 wherein the compound of formula:

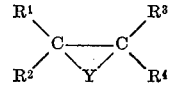

is ethyleneoxide.

6. A process according to claim 1 wherein the compound of formula:

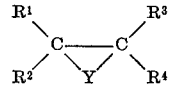

is ethylenimine.

7. A process according to claim 1 wherein the polar aprotic solvent is dimethyl formamide or dimethyl sulphonate.

8. A process according to claim 1 wherein the racemization is carried out at a temperature between 50° C. and 100° C.

9. A process according to claim 1 wherein the onium salt is tetrabutylammonium iodide.

References Cited

UNITED STATES PATENTS 3,673,206    6/1972    Bullock et al. _____ 260—306.7

RICHARD J. GALLAGHER, Primary Examiner